United States Patent
Park

(10) Patent No.: US 8,708,852 B2
(45) Date of Patent: Apr. 29, 2014

(54) VERTICAL SPRING RETURN VALVE ACTUATOR

(75) Inventor: Soon Won Park, Gyeonggi-do (KR)

(73) Assignee: Eunha Machinery Industrial Co., Ltd., Gwangmyeong, Gyeonggi-Do (KR)

( * ) Notice: Subject to any disclaimer, the term of this patent is extended or adjusted under 35 U.S.C. 154(b) by 369 days.

(21) Appl. No.: 13/085,188

(22) Filed: Apr. 12, 2011

(65) Prior Publication Data
US 2012/0264562 A1   Oct. 18, 2012

(51) Int. Cl.
*F16H 3/72* (2006.01)
(52) U.S. Cl.
USPC .................................................. 475/4
(58) Field of Classification Search
USPC .................................................. 475/4
See application file for complete search history.

(56) References Cited

U.S. PATENT DOCUMENTS

| | | | | |
|---|---|---|---|---|
| 4,616,528 A | * | 10/1986 | Malinski et al. | 475/4 |
| 4,760,989 A | * | 8/1988 | Elliott et al. | 251/129.03 |
| 4,896,562 A | * | 1/1990 | Wilkinson et al. | 475/3 |

FOREIGN PATENT DOCUMENTS

KR   100734394 B1   6/2007

* cited by examiner

*Primary Examiner* — Erin D Bishop
(74) *Attorney, Agent, or Firm* — Brinks Gilson & Lione

(57) ABSTRACT

A vertical spring return valve actuator includes a motor, a first worm gear and a second worm gear driving a sun gear of a planetary gear unit. The sun gear and planetary gears are rotated in a state where a ring gear is fixed by a brake unit during time of a normal operation. Also, a spring shaft, which is coupled to an output shaft of a planetary gear carrier operated cooperatively with the planetary gears, is rotated to permit a valve to be closed. At the time of a blackout, the brake unit is released, so that a spiral spring is unwound to permit the valve to be opened. Further, the valve is opened or closed manually through a valve manual opening and closing unit having a rotation member, a variable worm and a steering wheel.

6 Claims, 8 Drawing Sheets

VERTICAL SPRING RETURN VALVE ACTUATOR

BACKGROUND OF THE INVENTION

1. Field of the Invention

The present invention relates to a valve actuator adapted to open and close a valve, and more particularly, to a vertical spring return valve actuator that makes use of one planetary gear unit.

2. Background of the Related Art

A spring return valve actuator is designed to automatically open fans when power is turned off by a fire, thereby preventing the death from suffocation. The valve actuator working in a state of emergency is largely classified into a pneumatic type valve actuator that works with the force of compressed air and a motor drive type valve actuator that works with electricity. Since the pneumatic type valve actuator should need air pressure at the installation site thereof, the motor drive type valve actuator that easily works with the application of the electricity thereto is used widely.

The pneumatic type valve actuator makes use of a spiral spring as a driving force in case of emergency, and to the contrary, the motor drive type valve actuator makes use of emergency batteries as well as the spiral spring. On sites, generally, the spiral spring is more preferred than the batteries. In case of the motor drive type valve actuator, the spiral spring is directly mounted on a valve, so that an electronic brake is released at the time of emergency like a blackout to permit the valve to be actuated by means of the spiral spring. So as to directly activate the valve, in this case, the spiral spring should have relatively high tension, which undesirably needs skilled workers for manufacturing process and raises the production costs.

A representative example of conventional valve actuators is disclosed in Korean Patent No. 10-0734394 that is issued to the same applicant as this invention. The valve actuator discloses that the power of a motor is transmitted from a first worm to a first worm wheel and then transmitted to a second worm fixed around a concentric shaft to the first worm wheel, thereby permitting a valve connected to a second worm wheel operated cooperatively with the second worm to be opened and closed. In more detail, as shown in FIGS. 9 and 10, a valve actuator 1 includes a body 11, a motor 15 disposed inside the body 11, a first worm gear 10, a first planetary gear unit 30, a second planetary gear unit 40, a second worm gear 20, a steering wheel worm wheel 72 and a spiral spring 55. A sun gear 31 of the first planetary gear unit 30 is mounted around a brake shaft 60 working a brake at the time of application of power. At the time of normal operation, accordingly, since the sun gear 31 of the first planetary gear unit 30 mounted around the brake shaft 60 is fixed, the power applied from the motor 15 is transmitted sequentially to the first worm gear 10, a ring gear 35 and planetary gears 33 of the first planetary gear unit 30, a ring gear 45, planetary gears 43 and a sun gear 41 of the second planetary gear unit 40, and a second worm 21 and a second worm wheel 23 of the second worm gear 20, thereby permitting a valve (not shown) disposed on the second worm wheel 23 to be opened and closed. At the time of emergency operation wherein power is turned off, on the other hand, the brake shaft 60 is released to permit the force applied from the spiral spring 55 to actuate the second worm 21 and the sun gear 41, so that the closed valve becomes opened automatically. Further, at the time of emergency operation wherein power is turned off and the motor 15 stops, even in the state where the valve is opened by the force of the spiral spring 55, the steering wheel worm wheel 72, the second planetary gear 43 and the second worm 21 are activated by means of a stopper wheel 71 and a steering wheel 77 to permit the valve to be opened manually.

However, the conventional valve actuator needs a spring restoring force having a substantially large capacity, e.g., 500 Nm to 600 Nm and has an arrangement structure wherein two planetary gear units 30 and 40 are disposed in a lengthwise direction, thereby causing the whole length to be extended, so that the size of the actuator becomes bulky and the number of parts becomes increased.

SUMMARY OF THE INVENTION

Accordingly, the present invention has been made in view of the above-mentioned problems occurring in the prior art. It is an object of the present invention to provide a vertical spring return valve actuator that is provided with a first worm gear, a second worm gear and one planetary gear unit, so that the valve actuator can be used in states where power is turned on and off and the number of parts to be installed is reduced to provide a product having a substantially small volume.

It is another object of the present invention to provide a vertical spring return valve actuator that is capable of easily and reliably checking whether a valve is opened and closed through a transparent window mounted on a body.

It is still another object of the present invention to provide a vertical spring return valve actuator wherein the opening and closing operations of a valve are performed at a predetermined set angle, thereby avoiding the occurrence of malfunctions of the valve.

To accomplish the above objects, according to the present invention, there is provided a vertical spring return valve actuator including: a body; a motor disposed inside the body; a first worm gear having a first worm disposed around a drive shaft of the motor and a first worm wheel adapted to be engaged with the first worm; a second worm gear having a second worm formed extended from a shaft of the first worm wheel and a second worm wheel adapted to be engaged with the second worm; a planetary gear unit having a sun gear disposed around a shaft of the second worm wheel, planetary gears adapted to be engaged with the sun gear, and a ring gear adapted to be engaged with the planetary gears; a planetary gear support unit having a planetary gear carrier adapted to support the planetary gears and an output shaft disposed at the underside of the planetary gear carrier in such a manner as to be operated cooperatively with the planetary gears; a brake unit disposed on the outer surface of the ring gear and having a brake function; The valve actuator further comprises a spring return unit having a spring shaft coupled to the output shaft, and a stopper and a spiral spring disposed around the upper and lower sides of the outer surface of the spring shaft; and a valve manual opening and closing unit having an eccentric cam adapted to be rotated by means of a lever, a variable worm adapted to be rotatable around one end of the eccentric cam in such a manner as to be coupled to or separated from a portion of the outer periphery of the ring gear, and a steering wheel hinge-coupled to the other end of the variable worm.

According to the present invention, desirably, the variable worm and the eccentric cam of the valve manual opening and closing unit are coupled to each other by means of a driven bar, and the eccentric cam has an eccentric shaft adapted to be detachably mounted along a driven bar operating slit formed on the driven bar.

According to the present invention, desirably, the body has a driven bar limiting wall disposed at the position corresponding to the driven bar so as to provide a space in which the driven bar is movable.

According to the present invention, desirably, the spring return unit has the stopper disposed integrally to the top end periphery of the spring shaft and fixing bolts disposed inside the body on the same plane as the stopper in such a manner as to abut against the end portions of the stopper to perform a stopping operation.

According to the present invention, desirably, the shaft of the sun gear and the second worm wheel has a vertical through-hole formed along the center thereof, and the output shaft of the planetary gear support unit has a rotation recognition shaft disposed along the center thereof in such a manner as to be passed through the vertical through-hole and disposed at the top end of the body.

According to the present invention, desirably, the rotation recognition shaft has a rotation state display plate mounted at the top end thereof, and the body has a transparent window disposed at the corresponding position to the rotation state display plate.

According to the present invention, desirably, the output shaft and the spring shaft are coupled to each other by means of a concave portion formed on the output shaft and a convex portion formed on the spring shaft.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on a vertical spring return valve actuator according to a preferred embodiment of the present invention will be in detail given with reference to the attached drawings.

Figure 1:
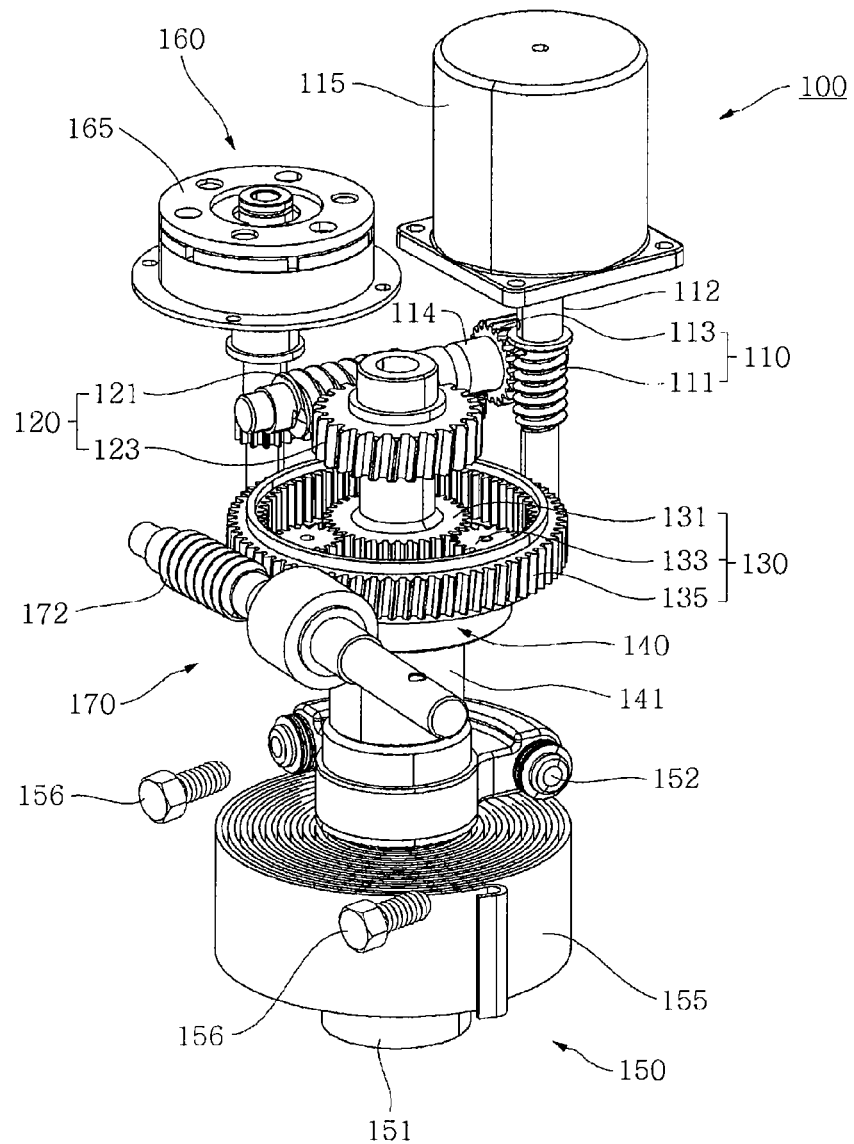
FIG. 1 is a perspective view showing an assembled state of a vertical spring return valve actuator according to the present invention.
Figure 2:
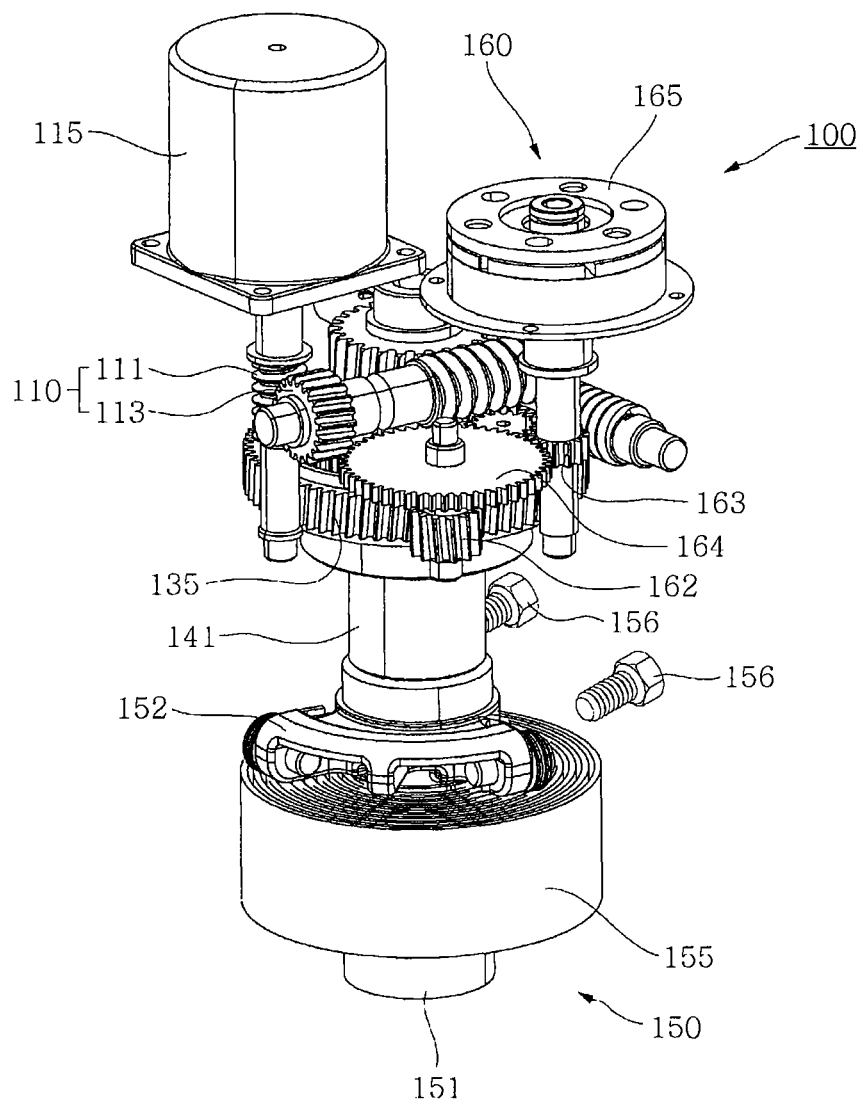
FIG. 2 is a bottom perspective view of FIG. 1.
Figure 3:
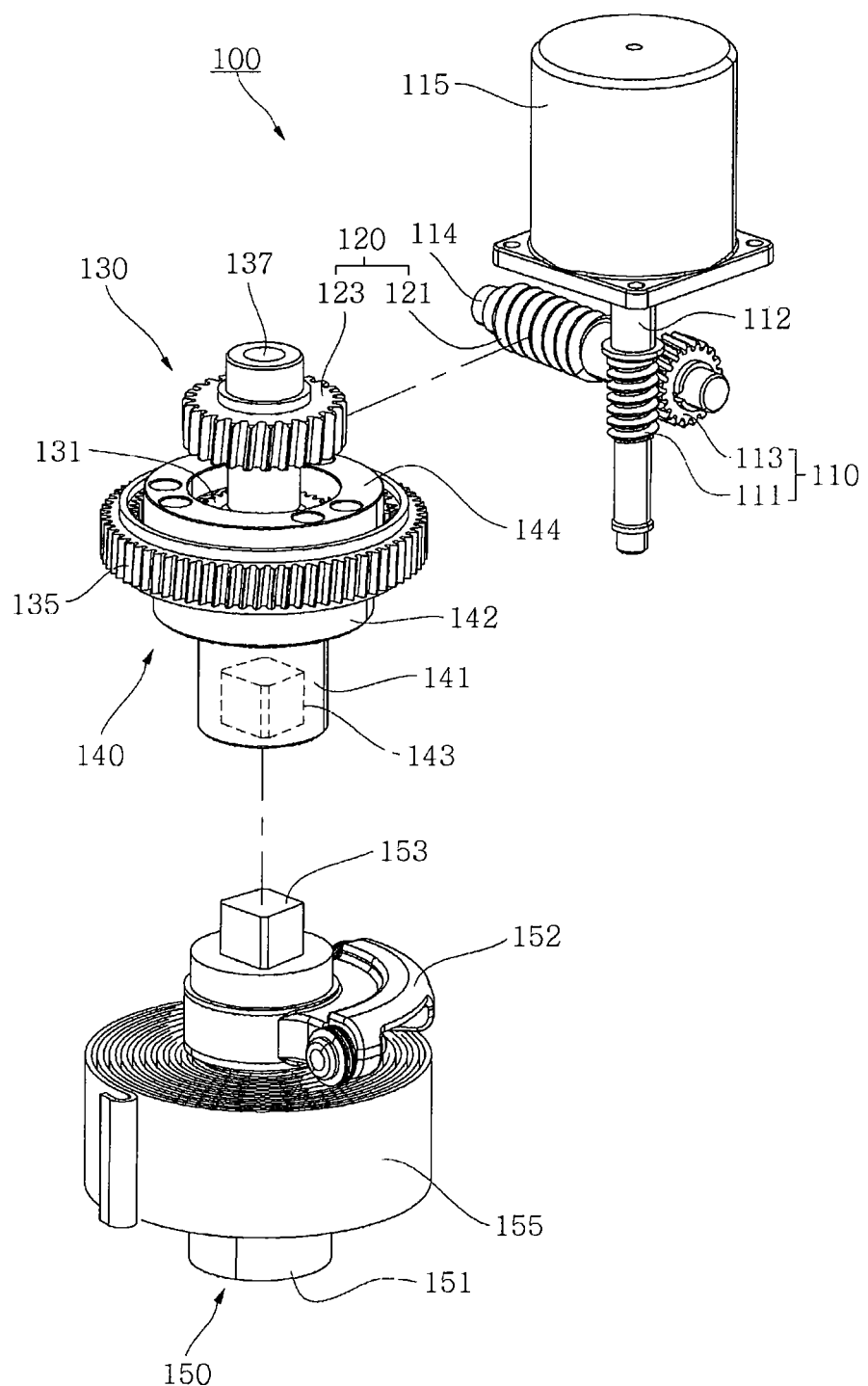
FIG. 3 is an exploded perspective view showing the main parts of the vertical spring return valve actuator according to the present invention.
Figure 4:
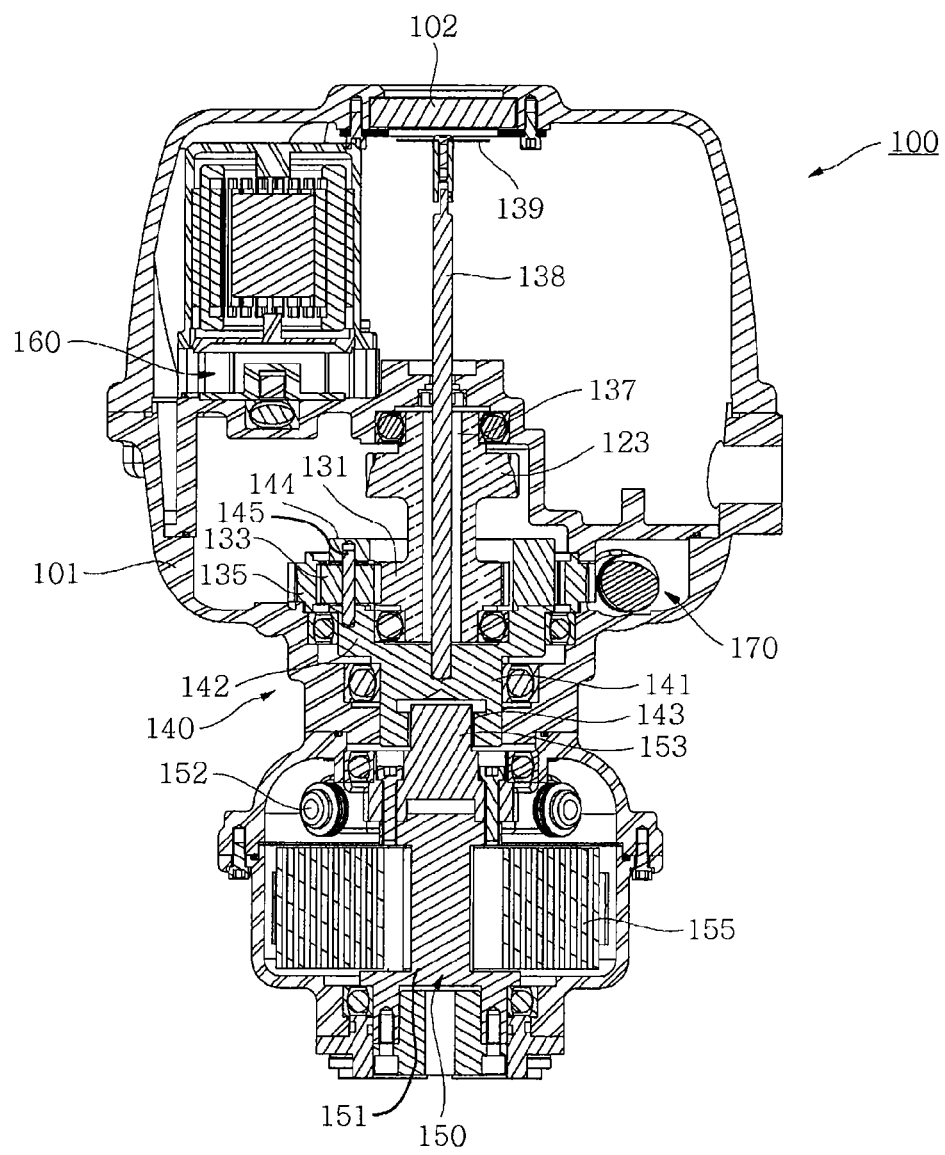
FIG. 4 is a vertical sectional view showing the assembled state of the vertical spring return valve actuator according to the present invention.
Figure 5:
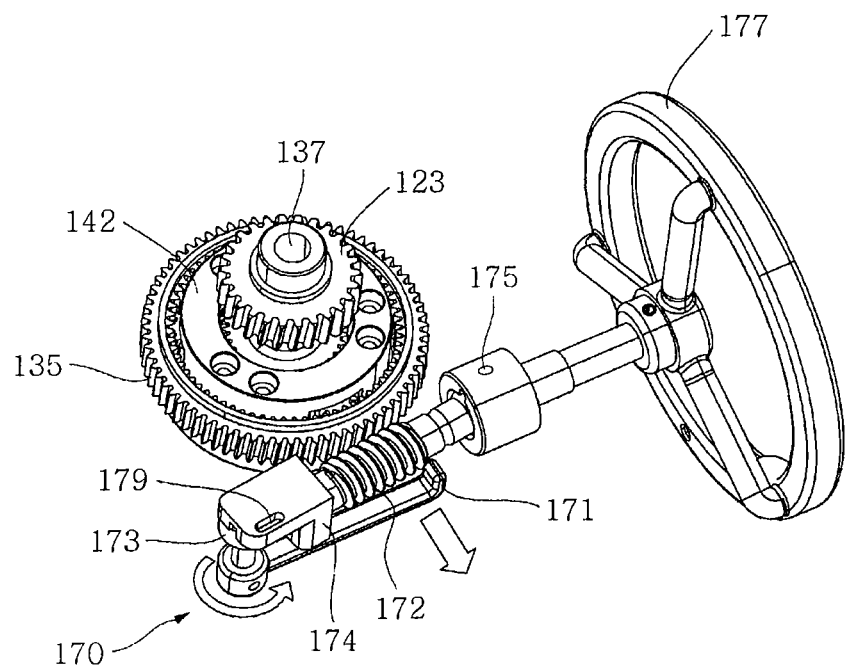
FIG. 5 is a perspective view showing the main parts to which the power applied from a steering wheel side is not transmitted.
Figure 6:
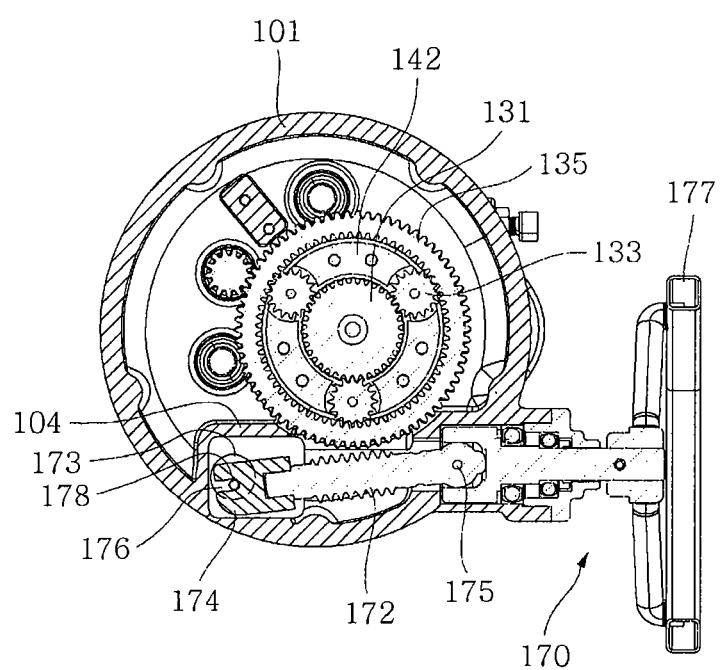
FIG. 6 is a horizontal sectional view of FIG. 5.
Figure 7:
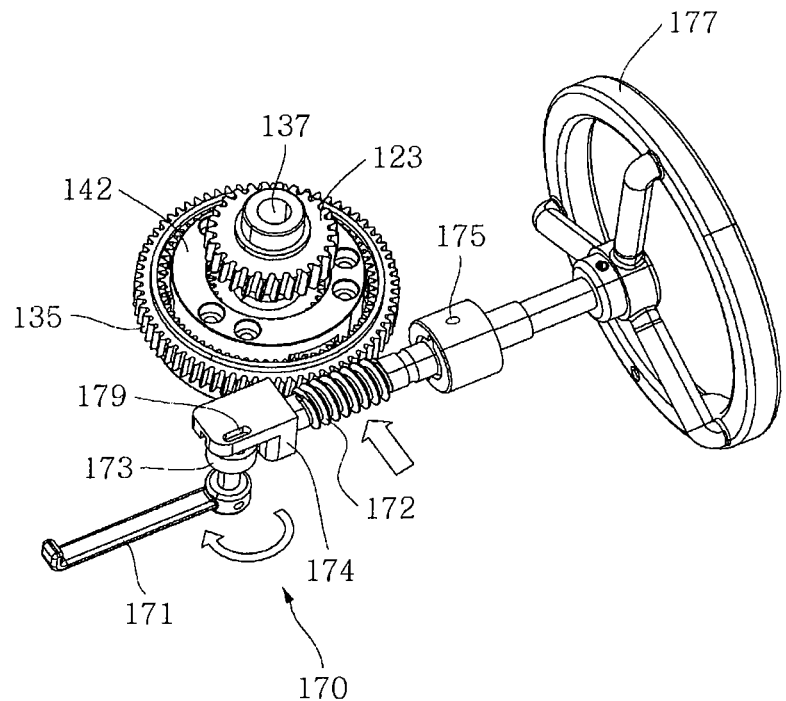
FIG. 7 is a perspective view showing the main parts to which the power applied from the steering wheel side is transmitted.
Figure 8:
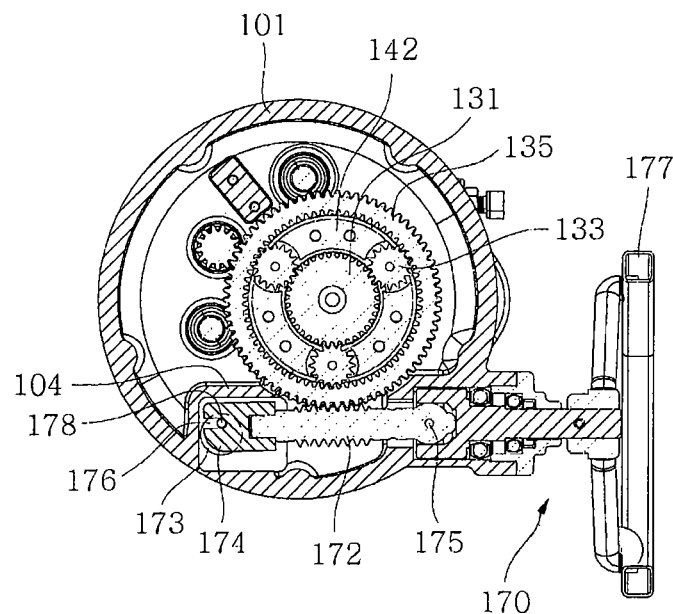
FIG. 8 is a horizontal sectional view of FIG. 7.
Figure 9:
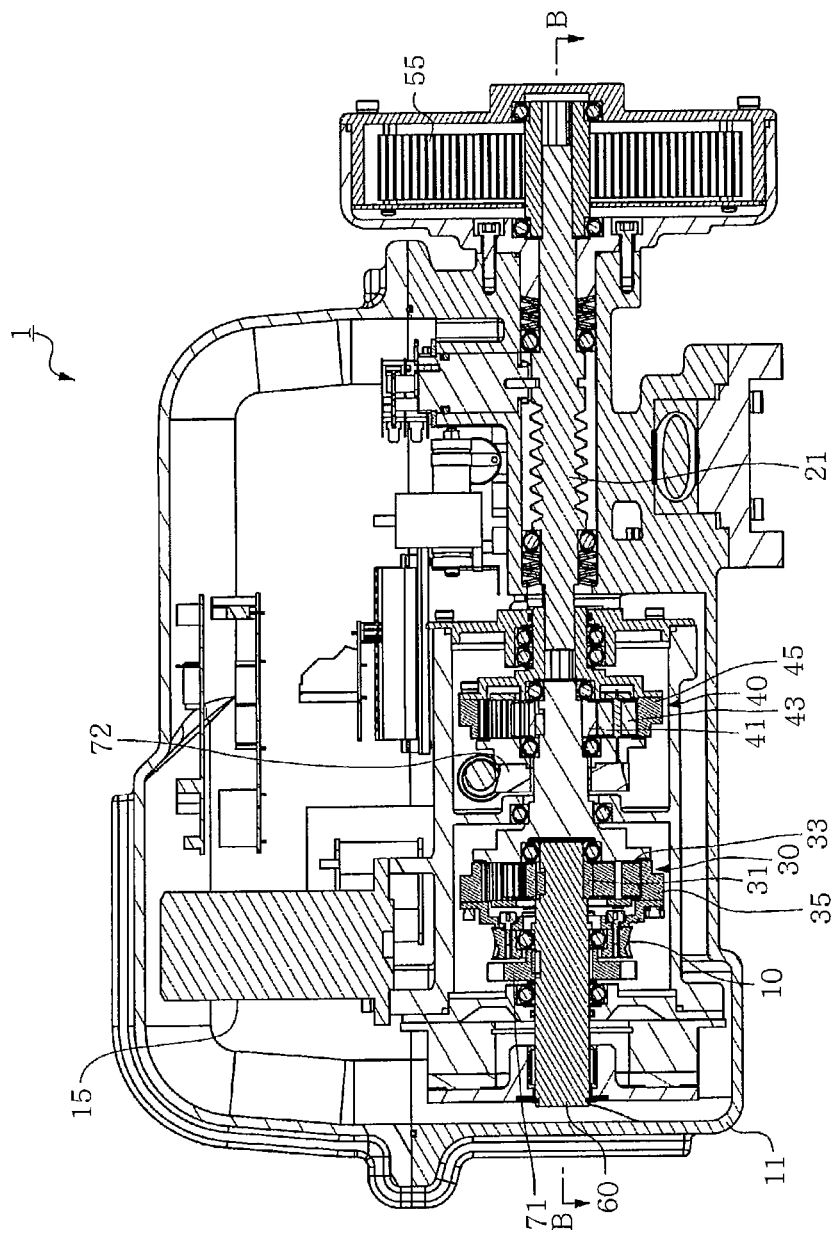
FIG. 9 is a sectional view showing a conventional horizontal valve actuator.
Figure 10:
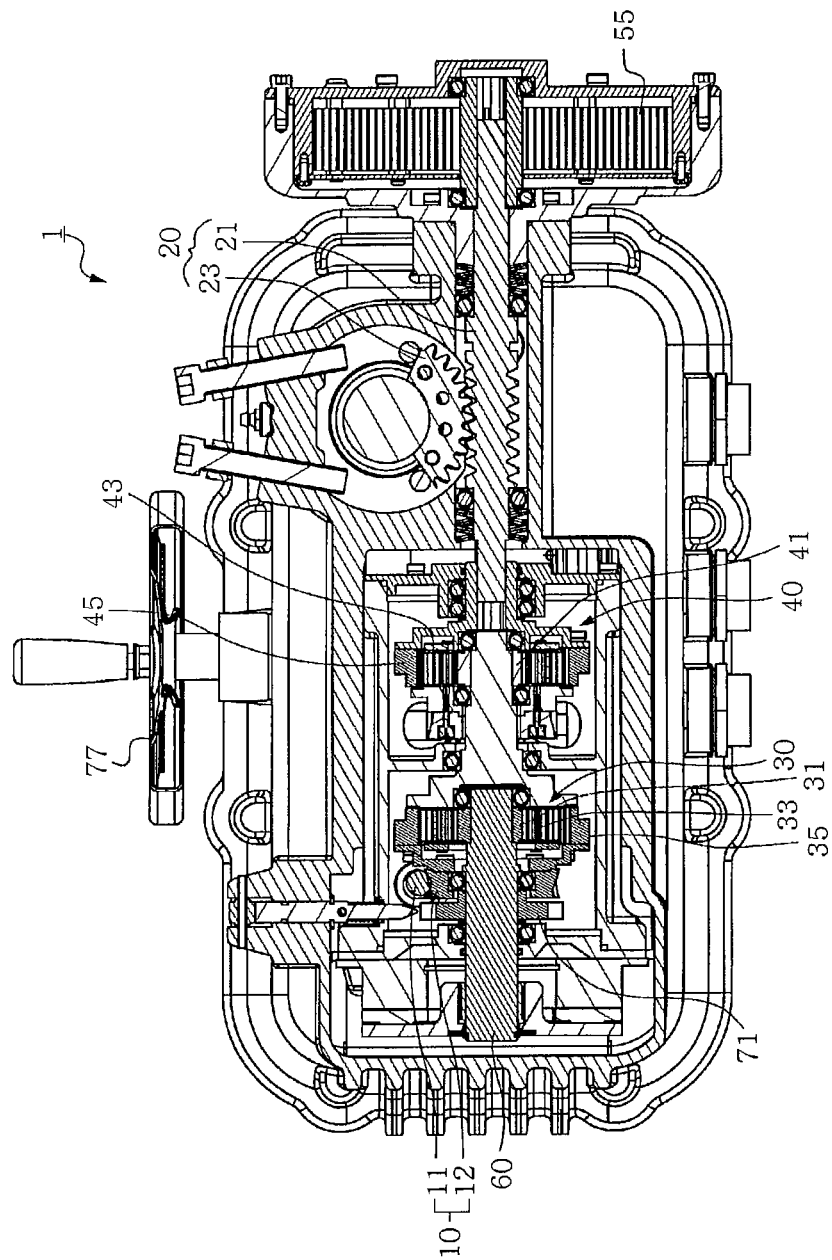
FIG. 10 is a sectional view taken along the line B-B of FIG. 9.

FIG. 1 is a perspective view showing an assembled state of a vertical spring return valve actuator according to the present invention, FIG. 2 is a bottom perspective view of FIG. 1, FIG. 3 is an exploded perspective view showing the main parts of the vertical spring return valve actuator according to the present invention, FIG. 4 is a vertical sectional view showing the assembled state of the vertical spring return valve actuator according to the present invention, FIG. 5 is a perspective view showing the main parts to which the power applied from a steering wheel side is not transmitted, FIG. 6 is a horizontal sectional view of FIG. 5, FIG. 7 is a perspective view showing the main parts to which the power applied from the steering wheel side is transmitted, and FIG. 8 is a horizontal sectional view of FIG. 7.

Referring to FIGS. 1 to 4, a vertical spring return valve actuator 100 according to the present invention includes a body 101, a motor 115 disposed inside the body 101, a first worm gear 110, a second worm gear 120, a planetary gear unit 130, a planetary gear support unit 140, and a brake unit 160, wherein in the actuator a spring return unit 150 is disposed at the underside of the planetary gear support unit 140.

The first worm gear 110 has a first worm 111 disposed around a drive shaft 112 of the motor 115 and a first worm wheel 113 adapted to be engaged with the first worm 111. The second worm gear 120 has a second worm 121 formed extended from a shaft 114 of the first worm wheel 113 and a second worm wheel 123 adapted to be engaged with the second worm 121.

The planetary gear unit 130 includes a sun gear 131 disposed concentrically to the second worm wheel 123, planetary gears 133 adapted to be engaged with the sun gear 131 in such a manner as to be rotated around the sun gear 131, and a ring gear 135 adapted to be engaged with the planetary gears 133.

The planetary gear support unit 140 includes a planetary gear carrier 142 adapted to support the planetary gears 133 and an output shaft 141 disposed at the underside of the planetary gear carrier 142 in such a manner as to be operated cooperatively with the planetary gears 133. In the structure of the planetary gear support unit 140, as shown in FIG. 4, the planetary gear carrier 142 and a carrier top plate 144 are coupled to each other by means of carrier-coupling screws 145, while placing the planetary gears 133 therebetween, so that they are moved around the sun gear 131, without inhibiting the rotation of the planetary gears 133. According to the present embodiment, the three planetary gears 133 are located between the planetary gear carrier 142 and the carrier top plate 144 in such a manner as to be at the same time rotated between the sun gear 131 and the ring gear 135.

The spring return unit 150 has a spring shaft 151 coupled to the output shaft 141 and a stopper 152 and a spiral spring 155 disposed around the upper and lower sides of the outer periphery of the spring shaft 151. The output shaft 141 and the spring shaft 151 are coupled to each other by means of the formation of a concave portion 143 and a convex portion 153. The vertical spring return valve actuator 100 according to the present invention has a valve (not shown) mounted on the spring shaft 151. Further, the stopper 152 is disposed integrally to the top end of the spring shaft 151 within an angle of about 90°, and desirably, fixing bolts 156 are disposed inside the body 101 on the same plane as the stopper 152 in such a manner as to abut against the end portions of the stopper 152 to perform a stopping operation.

The brake unit 160 includes a brake gear 162 disposed at the outer periphery of the ring gear 135 so as to perform a braking operation. The brake unit 160 has an electromagnetic brake 165 using electricity, a drive gear 163 connected around a shaft of the electromagnetic brake 165, a driven gear 164 adapted to be engaged with the drive gear 163, and the brake gear 162 disposed around a shaft of the driven gear 164 in such a manner as to be engaged with the ring gear 135 of the planetary gear unit 130. In case where the valve actuator 100 is normally operated, the brake unit 160 works to stop the operation of the ring gear 135, and in case where power is turned off, the operation of the brake unit 160 is released.

A valve manual opening and closing unit 170 has an eccentric cam 173 adapted to be rotated by means of a lever 171, a variable worm 172 adapted to be rotatable around one end of the eccentric cam 173 in such a manner as to be coupled to or separated from a portion of the outer periphery of the ring gear 135, and a steering wheel 177 adapted to be coupled to the other end of the variable worm 172 by means of a hinge pin 175 so as to provide power manually. The variable worm 172 and the eccentric cam 173 are coupled to each other by means of a driven bar 174, and an eccentric shaft 178 of the eccentric cam 173 is detachably mounted along a driven bar operating slit 176 formed on the driven bar 174. The body 101 has a driven bar limiting wall 104 disposed at the position corresponding to the driven bar 174 so as to provide a space in which the driven bar 174 is movable.

In the structure of the valve actuator 100 according to the present invention, as shown in FIG. 4, a vertical through-hole 137 is formed along the center of the shaft of the sun gear 131 and the second worm wheel 123, and a rotation recognition shaft 138 is passed through the vertical through-hole 137 in such a manner as to be disposed from the center of the output shaft 141 to the top end of the body 101, thereby recognizing the opening and closing rotation of the valve. Also, the rotation recognition shaft 138 desirably has a rotation state display plate 139 mounted at the top end thereof. The rotating state of the rotation state display plate 139 is seen from the outside through a transparent window 102 disposed on the body 101.

Hereinafter, an explanation on the operation of the vertical spring return valve actuator 100 according to the present invention will be given.

If power is turned on, first, the motor 115 is activated, and next, the spiral spring 155 is wound to close the valve. In more detail, if the motor 115 is activated by the application of power, as shown in FIG. 3, the first worm gear 110 is operated by means of the operation of the first worm 111 and the first worm wheel 113. After that, the power applied from the first worm gear 110 is transmitted to the shaft 114 of the first worm wheel 113 and the second worm wheel 123, so that the second worm wheel 123 is rotated in a clockwise direction. In this case, the ring gear 135 is at a stop state by the operation of the brake gear 162 of the brake unit 160 as shown in FIG. 2. Accordingly, the planetary gear carrier 142 and the carrier top plate 144 that support the planetary gears 133 are rotated in the clockwise direction, and the output shaft 141 connected integrally to the planetary gear carrier 142 winds the spiral spring 155. This means that the valve mounted on the spring shaft 151 is closed. Of course, if the motor 115 is rotated in the direction opposite to the above-mentioned process, the reverse operation to the above-mentioned process is performed to permit the valve to be opened.

On the other hand, in case where power supply stops due to a blackout in the state where the valve is closed, the motor 115 stops and at the same time the operation of the electromagnetic brake 165 using electricity is released to permit the ring gear 135 to be operated. Accordingly, the wound spiral spring 155 is automatically unwound to permit the valve to be opened. In this case, the ring gear 135 and the planetary gears 133 are rotated. However, the power is transmitted from the second worm 121 of the second worm gear 120 to the second worm wheel 123, but it is not transmitted in the direction opposite thereto, so that the sun gear 131 is not rotatable and the planetary gears 133 and the planetary gear carrier 142 are rotated in the direction where the spiral spring 155 is unwound to permit the valve to be opened.

In the state of the blackout, the valve actuator 100 according to the present invention can open and close the valve manually. In other words, at the time of the blackout, the brake unit 160 is released and the motor 115 stops. Also, the sun gear 131 halts. The valve is opened by the automatic unwinding operation of the spiral spring 155. In this state, for manual operation, the lever 171 of the valve manual opening and closing unit 170 is manually turned from the state as shown in FIG. 5 to the state as shown in FIG. 7. As a result, the eccentric cam 173 formed integrally to the lever 171 is rotated eccentrically to permit the eccentric shaft 178 to be pulled along the driven bar operating slit 176 so that the driven bar 174 is moved from the state as shown in FIG. 6 to the state as shown in FIG. 8 to allow the variable worm 172 to be engaged with the outer surface of the ring gear 135. In this state, if the steering wheel 177 is turned to a valve closing state, the ring gear 135 is rotated in a counterclockwise direction and the planetary gear carrier 142 is in a clockwise direction, so that the spiral spring 155 is wound to permit the valve to be closed again. In the same manner, the steering wheel 177 is turned in a direction opposite to the valve closing state, the valve is opened again. According to the present invention, further, it is possible to easily check whether the valve is opened and closed through the transparent window 102.

As described above, there is provided the vertical spring return valve actuator according to the present invention that has the first worm gear, the second worm gear and one planetary gear unit and is usable in states where power is turned on and off. Especially, the valve is automatically opened by the power of the spiral spring itself, and in the state of the blackout, the valve is opened and closed manually. Also, the valve is automatically opened at an initial step in the state of the blackout, but if necessary, the valve can be opened and closed manually. These can be achieved by using one planetary gear unit.

Further, the valve actuator of the invention has the transparent window disposed at the top end of the rotation recognition shaft so as to easily and reliably check whether the valve is opened and closed.

Additionally, the valve actuator of the invention has the stopper disposed horizontally around the spring shaft operated cooperatively with the output shaft to permit the valve to be rotated at a predetermined set angle, thereby preventing the malfunctions of the valve and avoiding the extension of the installation length to provide a product having a substantially small volume.

According to the present invention, moreover, the spring return unit can be mounted around the output shaft and the spiral spring itself can be reduced in size, so that the valve actuator of the invention can be especially useful as the valve actuator having a relatively small spring restoring force, for example, 150 Nm or less.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:
1. A vertical spring return valve actuator comprising:
   a body;
   a motor disposed inside the body;
   a first worm gear having a first worm formed on a drive shaft of the motor and a first worm wheel adapted to be engaged with the first worm;
   a second worm gear having a second worm extending from a shaft of the first worm wheel and a second worm wheel adapted to be engaged with the second worm;

a planetary gear unit having a sun gear fixed to a shaft of the second worm wheel, planetary gears adapted to be engaged with the sun gear to roll around the sun gear, and a ring gear adapted to be engaged with the planetary gears to travel around the planetary gears;

a planetary gear support unit having a planetary gear carrier adapted to support the planetary gears and an output shaft formed on a lower part of the planetary gear carrier wherein the planetary gear carrier rotates with the planetary gears;

a brake unit disposed on an outer surface of the ring gear and having a brake function;

a spring return unit having a spring shaft coupled to the output shaft, a spiral spring disposed around the spring shaft, and a stopping means for preventing unwinding of the spiral spring at a breakout state; and a valve manual opening and closing unit having an eccentric member adapted to be rotated by means of a lever, a variable worm adapted to be rotatable around one end of the eccentric member in such a manner as to be coupled to or separated from a portion of an outer periphery of the ring gear depending on an operation of the eccentric member, and a steering wheel hinge-coupled to an end of the variable worm opposite to the eccentric member.

2. The vertical spring return valve actuator according to claim 1, wherein the variable worm and the eccentric member are coupled to each other by means of a driven bar; and the eccentric member is provided with an eccentric shaft adapted to be detachably mounted along a driven bar operating slit formed on the driven bar.

3. The vertical spring return valve actuator according to claim 2, wherein the body has a driven bar limiting wall surrounding the driven bar so as to provide a space in which the driven bar is movable.

4. The vertical spring return valve actuator according to claim 1, wherein the stoppinq means has a stopper mounted on the spring shaft, the stopper rotating with the spring shaft; and fixing members disposed inside the body to abut against end portions;

of the stopper and limit a rotation of the stopper, thereby preventing unwinding of the spiral spring at the breakout state.

5. The vertical spring return valve actuator according to claim 1, wherein the shaft of the second worm wheel has a vertical through-hole, the body has a transparent window at a predetermined position and is provided with a rotation state display plate under the transparent window for checking an opening and closing state of a valve through the window, and a rotation recognition shaft passing through the vertical through-hole is rotably mounted between the output shaft and the rotation state display.

6. The vertical spring return valve actuator according to claim 5, wherein the output shaft and the spring shaft are coupled to each other by means of a concave portion formed on the output shaft and a convex portion formed on the spring shaft.

* * * * *